United States Patent [19]

Kigel et al.

[11] Patent Number: 5,304,710
[45] Date of Patent: Apr. 19, 1994

[54] METHOD OF DETOXIFICATION AND STABILIZATION OF SOILS CONTAMINATED WITH CHROMIUM ORE WASTE

[75] Inventors: Mark Y. Kigel, East Brunswick; John F. Shultis, Plainsboro; Eric S. Goldman, Metuchen; Mark K. Demytrk, North Bergen, all of N.J.

[73] Assignee: Envar Services, Inc., Cranford, N.J.

[21] Appl. No.: 19,089

[22] Filed: Feb. 18, 1993

[51] Int. Cl.⁵ .............................. B09B 3/00
[52] U.S. Cl. ........................ 588/257; 405/128; 405/266; 588/256
[58] Field of Search ............ 405/128, 129, 263, 264, 405/266; 588/252, 256, 257; 210/912, 913

[56] References Cited

U.S. PATENT DOCUMENTS

| | | |
|---|---|---|
| 3,852,084 | 12/1974 | Webster et al. |
| 4,105,463 | 9/1978 | Angelbeck |
| 4,132,558 | 1/1979 | Uchikawa et al. .......... 588/257 |
| 4,149,968 | 4/1979 | Kupiec ................ 405/128 X |
| 4,226,630 | 10/1980 | Styron ................... 588/257 |
| 4,338,134 | 7/1982 | Graf zu Münster. |
| 4,353,749 | 10/1982 | Ray et al. |
| 4,496,267 | 1/1985 | Gnaedinger. |
| 4,504,321 | 3/1985 | Kapland et al. .......... 588/256 |
| 4,518,508 | 5/1985 | Conner. |
| 4,547,290 | 10/1985 | Pichat ................... 588/257 |
| 4,629,509 | 12/1986 | O'Hara et al. |
| 4,651,656 | 3/1987 | Wallaer et al. |
| 4,687,373 | 8/1987 | Falk ..................... 405/128 |
| 4,741,776 | 5/1988 | Bye et al. |
| 4,744,829 | 5/1988 | Eirich et al. |
| 4,844,815 | 7/1989 | Ader et al. |
| 4,940,366 | 7/1990 | Suzuki. |
| 5,158,686 | 2/1991 | Kigel ................... 210/713 |

Primary Examiner—David H. Corbin
Attorney, Agent, or Firm—Horst M. Kasper

[57] ABSTRACT

A method for treating chromium ore waste contaminated soils by detoxification, fixation, immobilization and stabilization comprising the steps of soil grinding, pre-activating, reducing chromium valiancy, forming insoluble metal hydroxides, and incapsulating the chromium compounds containing agglomerates to prevent potential chromium leaching from the soil according with the standard toxicity characteristic leaching procedure requirements. Additive agents such as an acidic solution, a bivalent iron sulfur containing salt, e.g. ferrous sulfate, an alkalifying agent, e.g. calcium lime slurry or lime kiln dust or caustic, a stabilizing agent, e.g. cement, cement kiln dust, silicates, polyelectrolytes, and the like are also disclosed as assisting in the chromium immobilization reactions by reacting with certain constituents in the soil.

11 Claims, 1 Drawing Sheet

METHOD OF DETOXIFICATION AND STABILIZATION OF SOILS CONTAMINATED WITH CHROMIUM ORE WASTE

FIELD OF THE INVENTION

The present invention relates to a process for treating wastes, particularly by reducing toxic hexavalent chromium in chromium ore wastes to trivalent chromium, by sequencing admixture of said wastes with sulfuric acid, ferrous sulfate solution, lime, and cement or cement kiln dust, then neutralizing and hardening the mass, to produce a solid mass of soil wherein the chromium values therein are essentially non-toxic, said solid mass having essentially low permeability thus providing no leachate, particularly no toxic leachate. This method is an environmentally compatible technology for on-site remediation of soil, as well as similar materials such as mud, water/wastewater treatment process sludges, and municipal, industrial and/or agricultural chromium contaminated solid wastes.

BACKGROUND OF THE INVENTION

Remediation of contaminated diverse natural resources such as soils, river and lake muds, land development fields, water and wastewater treatment sludges and the like poses complicated problems. Particularly, chromium ore processing residue contains extremely toxic hexavalent chromium values which present a significant disposal problem.

The hexavalent chromium contaminated soils can adversely effect the environment by dry toxic dust being blown into the air which can cause carcinogenic effects on human health, and by the discharged leachates which, when flushed by rains and other precipitations through contaminated soils, muds, sludges, etc., would contain toxic chromium and would contaminate ground water aquifers, agricultural fields and surface water resources.

The invention presents a versatile system which lends itself to be adaptable to a wide variety of different field applications. Such applications of the proposed method also is of great importance in terms of environmental protection and natural resources recovery. Industries which discharge the toxic chromium ore are held responsible for remediating soil. If such industries no longer exist, the governmental agencies are often held accountable for reducing the concentrations of toxic contaminants to acceptable leachate levels normally tested by the Toxicity Characteristic Leaching Procedure (TCLP).

The present invention addresses the need for methods for detoxifying and stabilizing dangerous chromium compounds effectively in soils, muds, sludges, and the like. It will become apparent to those skilled in the art that the method disclosed herein is not limited in application solely to detoxification and stabilization of chromium ore contaminated soil mentioned above, and that the present invention is adaptable to other remediation efforts involving the treatment of other heavy metals.

Physical processes for heavy metal, particularly chromium removal from soils are known in the art and they include flushing the contaminated solid materials then treating elutriates and stabilizing toxic metals and other inorganic elements in a stable final material.

The known processes of soil flushing suffer many drawbacks because a substantial portion of the metals, particularly chromium, in the soils are bound with organic soil components and cannot be released unless the organic compounds are destroyed. That is why the relevant industries prefer chemical methods over physical procedures for removing heavy metals, particularly chromium, and other elements from contaminated materials, but these chemical methods of metal extraction are focused on costly and complex procedures.

There is a number of known processes and apparatus for heavy metals, particularly chromium, immobilization (stabilization) in contaminated solid material, residue or waste. However, there is no evidence that available methods used for contaminated soil remediation in non-toxic forms can economically meet current United States Environmental Protection Agency (USEPA) requirements based on the standard Toxicity Characteristic Leaching Procedure (TCLP) limits.

An example of such a method is described in U.S. Pat. No. 4,504,321 (1984) which is focused on admixing chromium ore waste with mud or sludge dredged from a natural preferably salty water source, then admixing the above mixture with ground granulated blast furnace slag and finishing with setting the final admixture in a quiescent state to yield a solid mass having low permeability and high load bearing characteristics. The unsolidified admixture is basified, particularly treated by lime, to yield pH 10.0-12.0. One of major drawbacks of this invention is the necessity of a source of salty water mud or sludge which restricts the area of applicability of this method. A further drawback of this method is complexity and cost of sludge (mud) treatment by settling/dewatering as well as that of blast furnace slag handling. Another drawback of this method is a relatively high pH of the final solid product which can cause problems by using the product as backfill.

Another procedure described in U.S. Pat. No. 4,132,558 for treating a sludge or drainage containing hexavalent chromium compounds comprises the use of calcium haloaluminate bearing rapid hardening cement in a short time for $Cr^{6+}$ fixation. The method is focused on hexavalent chromium fixation without reducing it to the trivalent state. The invention does not contain any information on meeting the TCLP limits, thus cannot be advantageous to the method proposed herein. Also such specific reagent as calcium haloaluminate can be expensive and is considered impractical for large amounts of soil to be treated.

A still further process for converting hazardous industrial or other wastes into an inert, non-polluting and useful soil-like product is described in U.S. Pat. No. 4,149,968. This method is based on treating the toxic wastes by an admixture of bentonite clays with portland cement in alkaline pH range to provide encapsulation of pollutants in the matrix of solid mass material. Along with a very high cost of bentonite clays, one of the most important disadvantages of this method is that the final product is liquid and requires large volumes of excavation and containment to provide hardening and handling.

U.S. Pat. No. 4,687,373 describes a coating composition for treating solid wastes to encapsulate toxic metal and/or organic pollutants from wastes includes an aqueous silicate solution containing potassium oxide and silicon dioxide, a catalytic amount of an aqueous sodium borate solution and a fixative containing solid calcium oxide with possible addition of fumed silica. Such an exotic composition was proposed for solid wastes treatment and is considered useful for small amount of a toxic metal containing material but impractical for soil remediation.

Thus, a continuing problem faced by those skilled in the art is the practical utility of incorporating above concepts into workable, efficient and feasible chemical engineering systems.

OBJECTS OF THE INVENTION

Thus, it is a general object of the present invention to provide a system which would combine chemical processes for toxic hexavalent chromium ion reduction to a non-toxic trivalent form with mechanisms for the stabilization thereof in neutralized soil.

Another general object of the present invention is to provide a technically and economically efficient practical method of selectively stabilizing chromium in contaminated soil, mud, sludge, and alike into a neutral, non-toxic, non-leachable solid material.

Another general object of the present invention is to provide a feasible industrial technology for the stabilization of toxic chromium in non-toxic final solid material by processes free of limitations and by a method feasible to be implemented in practical industrial process technologies.

Still another object of the present invention is to provide contaminated solid material activation by introducing and mixing a cost-effective water soluble reducing agent such as ferrous sulfate for chromium detoxification, and a cost-effective alkalifying agent such as lime slurry or dry lime which will meet the TCLP requirements. A hardening agent such as cement or cement kiln dust may be added to the processed material as a solidifying agent.

These and other objects will become apparent to those skilled in the art in light of the following disclosure.

SUMMARY OF THE INVENTION

What we intend to claim by general outline of the methodology related to the same field, is targeted to Toxicity Characteristic Leaching Procedure (TCLP) compliance and consists of the following major steps:
1) Pre-activation with an acidic solution, e.g. sulfuric acid aqueous solution, to pH $\leq 3.0$.
2) Detoxification of soluble toxic $Cr^{6+}$ by reducing ion valiancy into the trivalent non-toxic state $Cr^{3+}$ with activating agents, e.g. ferrous sulfate under acidic conditions at pH $\leq 3.0$ which enhance and speed up the reduction reaction.
3) Fixation and immobilization of $Cr^{3+}$ in the insoluble form of metal hydroxide by alkalification using inexpensive commercially available reagents usually applicable for neutralization processes, e.g. calcium hydroxide, caustic, etc.
4) When required, the final processed soil can be neutralized in any known way.
5) Stabilization of the processed soil by cement or other stabilization means which is added in amount of 0.5 to 15.0, preferentially 5.0 per cent by weight of the total material.

DETAILED DESCRIPTION OF THE INVENTION

Figure 1:
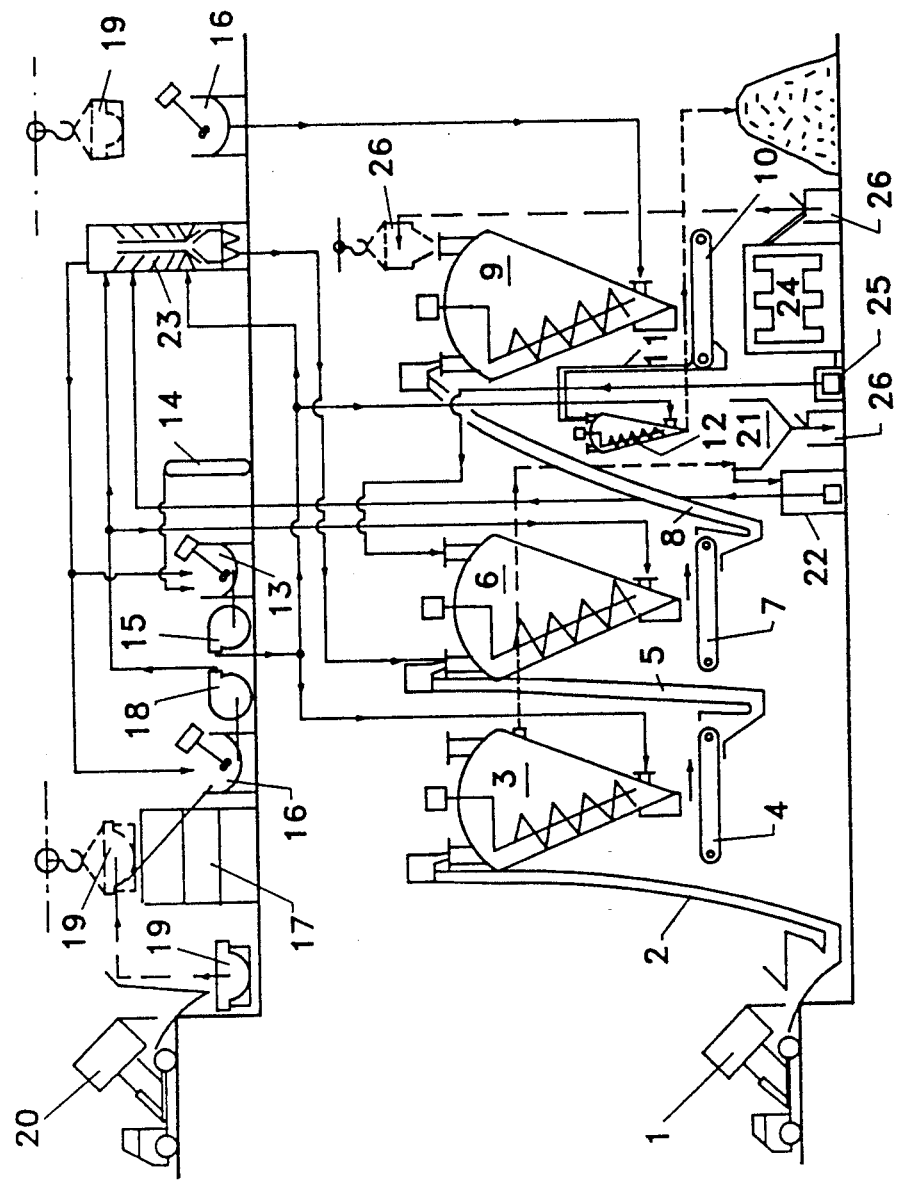
FIG. 1 is a schematic depiction of the method of $Cr^{6+}$ contaminated soil detoxification, fixation, immobilization and stabilization as invented.

The present invention relates to a process for treating chromium ore wastes to detoxify toxic hexavalent chromium by reducing to non-toxic trivalent chromium fixated in a hydroxide form and/or as hydrates and to solidify the material, said process comprising pre-activation of said chromium ore waste with an acidic, e.g. sulfuric acid, aqueous solution, to pH $\leq 3.0$ followed by admixing said pre-activated chromium ore waste with about 5% to 45%, preferentially 16% by weight, relative to hexavalent chromium content in the ore, of an activating (reducing) agent containing ferrous iron, e.g. ferrous sulfate aqueous solution, then alkalification with a basic agent, e.g. aqueous solution of lime or caustic, to pH $\leq 10.0$, to form trivalent chromium hydroxide, followed by neutralization to pH 7.5–8.2, final solidification and stabilization of the product with cement or cement kiln dust.

Essentially, hexavalent chromium can be reduced to trivalent chromium by acidification at pH 2–6 as is illustrated by the reduction of dichromate [F. A. Cotton, G. Wilkinson, *Advanced Inorganic Chemistry*, 5th Edition, Interscience, New York (1988)]:

$$Cr_2O_7^{2-} + 14H^+ + 6e = 2Cr^{3+} + 7H_2O \quad E^0 = 1.33 V$$

However, hexavalent chromium as an oxidizer is bound with organic compounds which are usually present in the chromium ore contaminated soil, and the reduction of all hexavalent chromium to trivalent chromium cannot be achieved only by acidification.

The present invention essentially is based upon the use of an oxidation-reduction reaction between hexavalent chromium and ferrous sulfate $FeSO_4$ in accordance with the general reaction schematic:

$$Cr^{6+} + Fe^{2+} \rightarrow Cr^{3+} + Fe^{3+}$$

which involves a mechanism of the sequencing intermediate phases of chromium reduction by ferrous iron [*Comprehensive Inorganic Chemistry*, Pergamon Press, New York]:

$$Fe(II) + Cr(VI) \rightarrow Fe(III) + Cr(V) \quad \text{(fast)}$$

$$Fe(II) + Cr(V) \rightarrow Fe(III) + Cr(IV) \quad \text{(rate-determining)}$$

$$Fe(II) + Cr(IV) \rightarrow Fe(III) + Cr(III) \quad \text{(fast)}$$

The cumulative rate of these reactions is pH-dependent.

The above oxidation-reduction reactions, reducing chromium from a hexavalent to a trivalent state, oxidize the ferrous ions into the trivalent ferric state whereby bivalent ferrous iron loses electrons thus becoming trivalent while hexavalent chromium accepts electrons thus becoming trivalent. To speed the reaction, acidic conditions in the range of pH 2.0–6.0, preferably at pH $\leq 3.0$ is desirable. The processed chromium ore has to be acidified prior to adding the ferrous sulfate solution to directly reduce a portion of hexavalent chromium to trivalent chromium and to prepare sufficient conditions for further chromium reduction by ferrous iron ions. This preliminary stage of the proposed method is considered the pre-activation stage wherein the chrome ore is activated for its subsequent detoxification by ferrous salts, e.g. by ferrous sulfate.

After chromium detoxification is complete, both trivalent chromium and trivalent (ferric) iron are treated with an alkalic reagent, e.g. with lime, caustic, etc. $Cr^{3+}$ ion requires the pH range of pH 10.0-12.4, depending on contaminated soil alkalinity, for its precipitation as $Cr(OH)_3$, which is virtually insoluble at such alkaline states. Thus, chromium hydroxide is formed under alkaline conditions:

$$Cr^{3+} + 3OH^- \rightarrow Cr(OH)_3 \downarrow$$

Particularly, hydrated lime in the form either of a slurry or of a dry powder is an ideal reagent for providing alkaline conditions, free hydroxyl ions, and as a starting medium for the formation of ferric hydroxide $[Fe(OH)_3]$ as a metal immobilizing (coprecipitating) matrix. Practically, ferric hydroxide and lime provide sufficient soil stabilization in terms of preventing contaminated leachates.

If the treated soil is used as a backfill material for site remediation, more physical strength and higher soil consolidation should be provided. For this purpose, the final product can be additionally treated with cement, cement kiln dust, fly ash, slag or any other material known in the art. Based on the present invention, the dosage of said materials can be substantially decreased, e.g. cement dosage can be of about 0.5% to 15%, preferentially 5% by weight relative to the weight of the final product.

The invention is explained in more detail by way of the drawing in FIG. 1 which is a schematic according to different embodiments of the invention as shown by two examples.

DETAILED DESCRIPTION OF EXEMPLARY EMBODIMENTS

The contaminated soil processing flow diagram shown in FIG. 1 illustrate physical accomplishment and operation of the proposed method. Raw ground and sifted soil contaminated with chromium ore is loaded by a transportation means 1 through a feeding system 2 into the activation reactor 3, said activation reactor is equipped with a mixing system, and an acidic solution is introduced into said activation reactor. The activated material at pH $\leq 3.0$ is reloaded from the activation reactor 3 by a conveyor 4 and a transportation means 5 into the detoxification reactor 6, said detoxification reactor is equipped with a mixing system, and a solution of a detoxification agent particularly, but not limited to, of aqueous solution of ferrous sulfate is introduced into said detoxification reactor. The detoxified material is reloaded from the detoxification reactor 6 by a conveyor 7 and transportation means 8 into the alkalification reactor 9, said alkalification reactor is equipped with a mixing system, and either dry hydrated lime or lime slurry or caustic is introduced into said alkalification reactor to provide non-toxic chromium fixation and immobilization. The alkalified material at pH $\geq 10.0$ is reloaded from the alkalification reactor 9 by a conveyor 10 and a transportation means 11 into the neutralization reactor 12, said neutralization reactor is equipped with a mixing system, and an acidic solution is introduced into said neutralization reactor to adjust to pH 7.5-8.2. Either dry portland cement or cement kiln dust or another stabilization agent can be introduced into said neutralization reactor for the final product additional solidification, when required.

The system shown in FIG. 1 is supplied with the acidifying and/or activation reagent solution preparation and dosing unit 13, said unit 13 is equipped with the acid and ferrous sulfate storage tanks 14 and with a pumping/dosing device 15. The system shown in FIG. 1 also is supplied with an alkalic reagent dosing unit 16, said alkalic reagent dosing unit is equipped with an alkalic reagent storage tank 17 and with a pumping/dosing device 18. In the event a dry alkalic reagent is used (e.g. hydrated lime), the system is equipped with a reagent receiver 19, dry alkalic reagent (e.g. hydrated lime) is supplied to said reagent receiver from a transportation means 20, then introduced into said reagent storage tank (e.g. lime silo). Said dry alkalic reagent can be alternatively dosed in the form of wet slurry or in the form of dry powder. If wet slurry is prepared, said alkalic reagent dosing unit 16 is a mixing tank, and said pumping/dosing device 18 is a slurry pump. If dry powder of said alkalic reagent is used, said alkalic reagent dosing unit 16 is an intermediate holding tank, and said pumping/dosing device 18 is a powder feeder. In the event a liquid alkalic reagent is used (e.g. caustic), said reagent receiver 19 is a drum or tank storage facility, said pumping/dosing device is a chemical solution pump, and said alkalic reagent dosing unit 16 is an intermediate holding tank.

The system can provide another embodiment of the present invention which comprises intermediate steps of soil elutriate (supernatant or subnatant) separation and treatment. In this case, soil flushing and phase separation is conducted in said activation reactor 3, and the elutriate is accumulated in a holding tank 21 then introduced by a pump 22 into a fluidized bed reactor 23 where said elutriate is treated as a heavy metal contaminated liquid by U.S. Pat. No. 5,158,686. The treated clean elutriate is then reused as process water in the stages of activation and fixation by the present invention.

Still another embodiment is provided by the system shown in FIG. 1 which comprises flushed soil separation into solid sludge and silty slurry, whereby silty slurry is additionally dewatered in a dewatering device 24 from which filtrate is introduced by pump 25 into said detoxification reactor 6 and solid material is introduced into said alkalification reactor 9 through a means 26.

The following are the examples of the steps involved in the proposed method of chromium ore detoxification and stabilization.

EXAMPLE 1

Three series of the lab-scale research program were conducted in order to experimentally develop the method ultimately proposed in this invention.

Series I

A lab-scale test was conducted with an attempt to remove chromium by flushing a chromium ore contaminated soil sample taken from a Jersey City, Hudson County, N.J. industrial site with sulfuric acid aqueous solution. The test was based on the two assumptions:
a. Sulfuric acid dissolves chromium trioxide which is a contaminated soil hexchrome representative compound forming a yellow aqueous solution which then can be treated with sulfur dioxide followed by alkalification to end up with insoluble chromium hydroxide.

b. Oxidation of trivalent chromium in the contaminated soil to soluble hexavalent state, in general, can be provided by acidification with strong acids along with strong oxidizers such as aqueous solution of hydrogen peroxide.

Six steps of this experiment were conducted with the purpose of removing or attempting to remove chromium from the contaminated soil by treatment with strong acids.

The first step of the experiment was acidification of raw soil to pH 4.0 (first flush). Then the second step which consisted of phase separation and resulted in primary soil sludge settling was conducted. The third step of the experiment was acidification of the primary sludge to pH 3.0 (second flush), and then secondary soil separation was conducted which resulted in secondary soil sludge settling. The fifth step was similar to the third step dealing with the secondary soil sludge acidified to pH 2.0 (third flush). The sixth step was final phase separation resulted in tertiary soil sludge settling as a final product. The tertiary sludge was considered as the final product of the processed soil.

The results of the above procedure based on the use of strong sulfuric acid are shown in Table 1.

TABLE 1

RESULTS OF LAB-SCALE TESTING OF CHROMIUM REMOVAL USING STRONG SULFURIC ACID FOR FLUSHING

| Sample points | pH | Chromium concentrations, ppm by total chromium in sludge |
| --- | --- | --- |
| Raw soil | 10.15 | 2,600 |
| First flush | 9.06 | 1,500 |
| Second flush | 7.90 | 1,300 |
| Third flush | 8.21 | 2,100 |

The results indicate that only 50% total chromium reduction was achieved with two flushes, and in the third flush the total chromium concentration increased because of chemical oxidation of soil organic material thus decreasing total solids content in the processed sample.

The second experiment was targeted to checking an alternative method of oxidizing chromium to hexavalent form, then flushing the soil in order to remove hexavalent soluble chromium with the elutriate, and then treating the elutriate as mentioned above. 30% solution of hydrogen peroxide was used as an oxidizing agent.

A bottom soil sample, a silty sludge sample and a liquid phase (supernatant) sample were tested for chromium.

The remaining bottom soil taken from the first wash was subject to a second hydrogen peroxide wash.

The results of the described lab-scale chromium removal testing procedure using oxidation by hydrogen peroxide are shown in Table 2.

TABLE 2

RESULTS OF LAB-SCALE TESTING OF CHROMIUM REMOVAL USING HYDROGEN PEROXIDE (first flush)

| Sample points | Chromium concentration, ppm | | |
| --- | --- | --- | --- |
| | Hexchrome | Trichrome | Total chromium |
| Raw soil | | | 1,000 |
| Bottom sludge | 120 | 410 | 530 |

TABLE 2-continued

RESULTS OF LAB-SCALE TESTING OF CHROMIUM REMOVAL USING HYDROGEN PEROXIDE (first flush)

| Sample points | Chromium concentration, ppm | | |
| --- | --- | --- | --- |
| | Hexchrome | Trichrome | Total chromium |
| Slurry sludge | 225 | 1,075 | 1,300 |
| Supernatant | 79 | 4 | 83 |

The results in Table 2 show that most of hexavalent chromium flushed from the soil by oxidation is accumulated in the sludges.

In order to check a possibility of additional chromium removal from the sludges obtained in the first soil flushing with hydrogen peroxide, the second flush of the bottom and slurry sludge mixture with hydrogen peroxide have been carried out, and the results of this test are shown in Table 3.

The results from Table 3 show that, even after the second soil flushing with hydrogen peroxide, chromium still remains in the sludges and is not sufficiently flushed out.

The soil flushing test results have illustrated that flushing methods do not provide chromium removal from the chromium ore contaminated soil.

Series II

Further experiments were targeted to provide technologies for chromium fixation and/or immobilization in soil in form of final stable chromium compounds classified as a non-hazardous material with subsequent test of potential chromium leachate from the treated soil.

TABLE 3

RESULTS OF LAB-SCALE TESTING OF CHROMIUM REMOVAL USING HYDROGEN PEROXIDE (second flush)

| Sample points | Total chromium concentration, ppm |
| --- | --- |
| Bottom sludge II | 680.0 |
| Slurry sludge II | 490.0 |
| Supernatant II | 6.2 |

The test run of the lab-scale experiments was carried out with the samples taken from another site of contaminated soil in Jersey City, Hudson County, N.J. The purpose of the test was to check the possibility of chromium fixation in the soil in a non-hazardous form, i.e. to convert hexavalent chromium into trivalent chromium hydroxide form. For that experiment, an aqueous sulfuric acid solution adjusted to pH 3.0 and a 33% calcium hydroxide slurry were prepared.

Once pH 4.0 was achieved in the soil acidic mixture, a sample was collected. The remainder of the acidified soil was further reduced to pH 3.0, and a second sample was collected. A final sample was collected at a pH 2.0 in the admixture.

The second phase of the experiment was to alkalify the acidic soil slurry. 33% strong calcium hydroxide slurry was then added to the pH 3.0 acidified soil admixture until pH 9.0 had been achieved. The soil alkalification procedure continued on step-by-step basis, and the remainder of the soil slurry at pH 11.6 was used for the third phase of this experiment, which was targeted to neutralize the soil. To this pH 11.6 soil slurry, slightly acidic water at pH 4.5 was added until pH 7.0 was obtained. The neutralized soil mixture was separated by gravity.

The results of the lab-scale chromium fixation testing procedure are shown in Table 4.

There is some increase in trivalent and total chromium concentrations in course of soil treatment. This is can be explained by chemical oxidation and/or by alkalic hydrolysis of organic material in the solids.

An additional test with another soil sample from the same contaminated site was carried out in order to check stability of the final product of the chromium fixation process for chromium leachate measured by the Toxicity Characteristic Leaching Procedure (TCLP Test, EPA Method 1311).

TABLE 4

RESULTS OF LAB-SCALE TESTING OF CHROMIUM FIXATION

| Sample points | pH | Chromium concentrations, ppm | | |
|---|---|---|---|---|
| | | Hexavalent | Trivalent | Total |
| Raw soil | 10.40 | 22.00 | 1,378 | 1,400 |
| Acidified soil | 7.12 | 0.50 | 940 | 940 |
| Acidified soil | 6.37 | 0.48 | 2,100 | 2,100 |
| Acidified soil | 4.04 | 0.33 | 1,300 | 1,300 |
| Alkalified soil | 8.37 | ND | 2,200 | 2,200 |
| Alkalified soil | 9.63 | ND | 1,500 | 1,500 |
| Alkalified soil | 12.24 | ND | 1,100 | 1,100 |
| Alkalified effluent | 12.17 | ND | ND | ND |
| Alkalified sludge | 12.28 | ND | 1,700 | 1,700 |
| Processed soil | 10.11 | ND | 1,200 | 1,200 |

The results of TCLP testing are shown in Table 5.

TABLE 5

RESULTS OF PROCESSED SOIL TCLP TESTING

| Sample points | Chromium concentration, ppm | | | TCLP, ppm |
|---|---|---|---|---|
| | Hexchrome | Trichrome | Total chromium | |
| Raw soil | 8.3 | 991.7 | 1,000 | 7.4 |
| Processed soil | 2.7 | 583.7 | 590 | 6.9 |

TCLP limit for chromium is 5.0 ppm, hence the above known method of chromium fixation in the contaminated soil does not meet current USEPA requirements based on the TCLP limits.

Series III

The third series of the experiments was conducted to select a proper chromium detoxifying reagent to meet the regulatory TCLP limits.

The test run was carried out with a soil sample taken from a Baltimore, Md. chromium ore contaminated industrial site. For that experiment, an aqueous sulfuric acid solution adjusted to pH 2.0 and a 33% calcium hydroxide slurry were prepared. Once pH 3.0 was achieved in the soil acidic mixture, 15% by weight of 40% aqueous solution of ferrous sulfate ($FeSO_4 \cdot 7H_2O$) as a chromium detoxifying agent was admixed with the sample. After that, pH raised to pH 3.7. Then 33% strong calcium hydroxide slurry was added to the pH 3.7 acidified soil admixture until pH 10.0 had been achieved. The soil alkalification procedure continued on step-by-step basis, and the remainder of the sample at pH 12.0 was subject to neutralization. The final material was divided into two portions one of which was tested for TCLP, while another one was subject to 5% and 15% cement admixing related to the weight of the material for further soil stabilization.

The processed soil sample had been tested for chromium leachate measured by the Toxicity Characteristic Leaching Procedure (TCLP Test, EPA Method 1311). The results of TCLP testing are shown in Table 6.

TABLE 6

RESULTS OF TCLP TESTING FOR SOIL TREATMENT BASED ON THE PROPOSED METHOD

| Samples | TCLP, ppm |
|---|---|
| Contaminated soil | 113.00 |
| After fixation and stabilization with 15% cement | 34.00 |
| Detoxified soil without stabilization | 1.79 |
| Detoxified and stabilized soil | 2.44 |

The test results in Table 6 show that a process of chromium pre-activation, detoxification, fixation and immobilization fully meets the TCLP-based USEPA requirements (the regulatory TCLP limit is 5 ppm). The results also show that additional cement stabilization essentially does not provide additional TCLP reduction, i.e. detoxification with ferrous sulfate is sufficient for meeting TCLP requirements. Cement stabilization can be recommended only for additional product solidification.

EXAMPLE 2

The technology of chromium pre-activation, detoxification, fixation, immobilization and additional stabilization by the present invention has been tested at a Baltimore, Md. chromium ore contaminated industrial site as a full-scale field demonstration procedure. The results are shown in Table 7.

The elevated TCLP magnitude in Test No. 5 (Table 7) may be attributed to a larger particle size in the processed material which resulted in insufficient mass exchange between the treated material and the reagents. Thus, preliminary soil grinding and sifting to an about 100 mesh size provided by any method known to the skilled-in-the-art is required for industrial implementation of the method.

TABLE 7

RESULTS OF TCLP TESTING FOR ON-SITE SOIL TREATMENT BASED ON THE PROPOSED METHOD

| Samples | TCLP, ppm |
|---|---|
| Contaminated soil | 113.00 |
| Processed soil (Test 1) | <0.10 |
| Processed soil (Test 2) | <0.10 |
| Processed soil (Test 3) | <4.10 |
| Processed soil (Test 4) | <0.20 |
| Processed soil (Test 5) | 6.30 |
| Processed soil (Test 6) | 0.77 |

What we claim is:

1. A method of detoxification, fixation, immobilization and stabilization of soils contaminated with chromium ore waste comprising the steps of:
   a. grinding the contaminated soil;
   b. pre-activating the soil treated in step (a.) with an aid of an acidic solution to reach a pH of less than or equal to about 3.0 to enhance subsequent chromium detoxification;
   c. detoxifying hexavalent chromium, wherein a valiancy of the hexavalent chromium is reduced to a trivalent state in an admixture with a detoxifying agent;
   d. fixing and immobilizing trivalent chromium in a form of insoluble chromium hydroxide by adding an alkalifying agent;
   e. neutralizing the processed soil by adding an acid solution to reach a pH of 7.5 to 8.2; and f. stabilizing the processed soil by adding a stabilizing agent.

2. The method of detoxification, fixation, immobilization and stabilization of soils contaminated with chromium ore waste according to claim 1 further comprising the intermediate steps of:
- separating primary soil elutriate;
- subsequently treating the primary soil elutriate;
- collecting a final clean elutriate reusable as process water for processing the soil in the steps of activation and fixation.

3. A method of detoxification, fixation, immobilization and stabilization of soils contaminated with chromium ore waste according to claim 1 further comprising the steps of:
- flushing the processed soil;
- separating flushed soil into a solid sludge and a silty slurry followed by a separate detoxification, fixation, immobilization and stabilization of said solid sludge and said silty slurry;
- dewatering the silty slurry before effecting a stabilization; and
- treating a secondary elutriate together with the primary elutriate for future reuse.

4. The method according to claim 1, wherein the detoxifying agent is aqueous solution of ferrous sulfate.

5. The method according to claim 1, wherein the stabilizing agent is cement.

6. The method according to claim 1, wherein the alkalifying agent is hydrated lime.

7. The method according to claim 1, wherein the alkalifying agent is a caustic agent.

8. The method according to claim 2, wherein separating the primary soil elutriate is supernatant.

9. The method according to claim 2, wherein separating the primary soil elutriate is subnatant.

10. The method of detoxification, fixation, immobilization and stabilization of soils contaminated with chromium ore waste according to claim 2 further comprising the steps of:
- flushing the processed soil;
- separating flushed soil into a solid sludge and a silty slurry followed by a separate detoxification, fixation, immobilization and stabilization of said solid sludge and said silty slurry;
- dewatering the silty slurry before effecting a stabilization; and
- treating a secondary elutriate together with the primary elutriate for future reuse.

11. A method of detoxification, fixation, immobilization and stabilization of soils contaminated with chromium ore waste comprising the steps of:
- a. grinding the contaminated soil;
- b. pre-activating the soil treated in step (a) with an aid of an acidic solution to reach a pH of less than or equal to about 3.0 to enhance subsequent chromium detoxification;
- c. detoxifying hexavalent chromium, wherein a valiancy of the hexavalent chromium is reduced to a trivalent state in an admixture with a detoxifying agent;
- d. fixing and immobilizing trivalent chromium in a form of insoluble chromium hydroxide by adding an alkalifying agent;
- e. neutralizing the processed soil by adding an acid solution to reach a pH of 7.5 to 8.2.

* * * * *